US008623237B2

(12) United States Patent
MacLachlan et al.

(10) Patent No.: US 8,623,237 B2
(45) Date of Patent: Jan. 7, 2014

(54) INORGANIC MESOPOROUS MATERIALS WITH CHIRAL NEMATIC STRUCTURES AND PREPARATION METHOD THEREOF

(75) Inventors: Mark John MacLachlan, Vancouver (CA); Kevin Eric Shopsowitz, Vancouver (CA); Wadood Yasser Hamad, Vancouver (CA); Hao Qi, Vancouver (CA)

(73) Assignees: University of British Columbia, Vancouver (CA); FPInnovations, Pointe-Claire, Quebec (CA)

( * ) Notice: Subject to any disclaimer, the term of this patent is extended or adjusted under 35 U.S.C. 154(b) by 144 days.

(21) Appl. No.: 13/076,469

(22) Filed: Mar. 31, 2011

(65) Prior Publication Data

US 2011/0248214 A1 Oct. 13, 2011

Related U.S. Application Data

(60) Provisional application No. 61/322,508, filed on Apr. 9, 2010.

(51) Int. Cl.
| | |
|---|---|
| *C09K 19/02* | (2006.01) |
| *C09K 19/52* | (2006.01) |
| *B01D 67/00* | (2006.01) |
| *B01D 71/02* | (2006.01) |
| *C01B 33/12* | (2006.01) |
| *B82Y 40/00* | (2011.01) |
| *C08K 3/36* | (2006.01) |
| *C01G 17/02* | (2006.01) |
| *C01G 19/02* | (2006.01) |

(52) U.S. Cl.
USPC ...... 252/299.01; 977/778; 977/783; 977/786; 977/813; 977/814; 977/827; 977/840; 264/48; 423/335; 423/618

(58) Field of Classification Search
USPC ............. 252/299.01; 977/840, 778, 783, 786, 977/813, 814, 827; 264/48; 423/335, 618
See application file for complete search history.

(56) References Cited

U.S. PATENT DOCUMENTS

| | | | |
|---|---|---|---|
| 5,108,725 A | 4/1992 | Beck et al. | |
| 5,629,055 A | 5/1997 | Revol et al. | |
| 2009/0043003 A1 | 2/2009 | Tatsumi et al. | |
| 2013/0089492 A1* | 4/2013 | MacLachlan et al. | ........ 423/608 |

FOREIGN PATENT DOCUMENTS

WO 9111390 8/1991

OTHER PUBLICATIONS

International Search Report, PCT/CA2011/000346, dated Jul. 14, 2011.

Kanatzidis, M. G. Beyond silica: nonoxidic mesostructured materials. Adv. Mater. 19, 1165-1181 (2007).
Kresge, C.T., Leonowicz, M.E., Roth, W.J., Vartuli, J.C. & Beck, J.S. Ordered mesoporous molecular sieves synthesized by a liquid-crystal template mechanism. Nature 359, 710-712 (1992).
Yang, P., Zhao, D., Margolese, D.I., Chmelka, B.F. & Stucky, G.D. Generalized syntheses of large-pore mesoporous metal oxides with nanocrystalline walls. Nature 396, 152-154 (1998).
Armatas, G.A. & Kanatzidis, M.G. Hexagonal mesoporous germanium. Science 313, 817-820 (2006).
MacLachlan, M.J., Coombs, N. & Ozin, G.A. Non-aqueous supramolecular assembly of metal germanium sulfide mesostructures from [Ge4S10]4-clusters. Nature 397, 681-684 (1999).
Inagaki, S., Guan, S., Ohsuna, T., Terasaki, O. An ordered mesoporous organosilica hybrid material with a crystal-like wall structure. Nature 416, 304-307 (2002).
Sun, D., Riley, A.E., Cadby, A.J., Richman, E.K., Korlann, S.D. & Tolbert, S.H. Hexagonal nanoporous germanium through surfactant-driven self-assembly of Zintl clusters. Nature 441, 1126-1130 (2006).
Attard, G.S., Glyde, J.C. & Goltner, C.G. Liquid-crystalline phases as templates for the synthesis of mesoporous silica. Nature 378, 366-368 (1995).
Gabashvili, A., Medina, D. D., Gedanken, A. & Mastai, Y. Templating mesoporous silica with chiral block copolymers and its application for enantioselective separation. J. Phys. Chem. B 111, 11105-11110 (2007).
Johnson, B. F. G. et al. Superior performance of a chiral catalyst confined within mesoporous silica. Chem. Commun. 1167-1168 (1999).
Fireman-Shoresh, S., Popov, I., Avnir, D. & Marx, S. Enantioselective, chirally templated sol-gel thin films. J. Am. Chem. Soc. 127, 2650-2655 (2005).

(Continued)

*Primary Examiner* — Shean C Wu
(74) *Attorney, Agent, or Firm* — Norton Rose Fulbright Canada LLP (57) ABSTRACT

The present invention describes a composition and a method for producing mesoporous silica materials with a chiral organization. In the method, a polymerizable inorganic monomer is reacted in the presence of nanocrystalline cellulose (NCC) to give a material of inorganic solid with cellulose nanocrystallites embedded in a chiral nematic organization. The NCC can be removed to give a stable porous structure that retains the chiral organization of the NCC template. The new materials may be obtained as iridescent free-standing films with high surface area. Through control of the reaction conditions, the color of the films can be varied across the entire visible spectrum. These are the first materials to combine mesoporosity with long-range chiral ordering that leads to photonic properties. Examples of possible applications of the materials are: lightweight reinforcement materials, low k dielectric materials, tunable reflective filters, adsorbents, stationary phases for chromatography of chiral or achiral substances, supports for catalysts (e.g., for asymmetric synthetic transformations), and as a template to generate other new porous materials (e.g., porous carbon or porous metals), preferably with chiral nematic structures.

34 Claims, 11 Drawing Sheets

(56) References Cited

OTHER PUBLICATIONS

Hodgkinson, I. & Wu, Q. H. Inorganic chiral optical materials. Adv. Mater. 13, 889-897 (2001).

Che, S. et al. Synthesis and characterization of chiral mesoporous silica. Nature 429, 281-284 (2004).

Qiu, H.B., Inoue, Y. & Che, S.N. Supramolecular chiral transcription and recognition by mesoporous silica prepared by chiral imprinting of a helical micelle. Angew. Chem. Int. Ed. 48, 3069-3072 (2009).

Broer, D. J., Lub, J. & Mol, G. N. Wide-band reflective polarizers from cholesteric polymer networks with a pitch gradient. Nature 378, 467-469 (1995).

Yang, D. -K., West, J. L., Chien, L. -C. & Doane, J. W. Control of reflectivity and bistability in displays using cholesteric liquid crystals. J. Appl. Phys. 76, 1331-1333 (1994).

Kopp, V. I., Fan, B., Vithana, H. K. M. & Genack, A. Z. Low-threshold lasing at the edge of a photonic stop band in cholesteric liquid crystals. Opt. Lett. 23, 1707-1709 (1998).

Akagi, K. ET al. Helical polyacetylene synthesized with a chiral nematic reaction field. Science 282, 1683-1686 (1998).

Sharma, V., Cme, M., Park, J. O. & Srinivasarao, M. Structural origin of circularly polarized iridescence in jeweled beetles. Science 325, 449-451 (2009).

Mukherjee, S. M. & Woods, H. J. X-ray and electron microscope studies of the degradation of cellulose by sulphuric acid. Biochim. Biophys. Acta 10, 499-511 (1953).

Revol, J. F., Bradford, H., Giasson, J., Marchessault, R. H. & Gray, D. G. Helicoidal self-ordering of cellulose microfibrils in aqueous suspension. Int. J. Biol. Macromol. 14, 170-172 (1992).

Revol, J.F., Godbout, L. & Gray, D.G. Solid self-assembled films of cellulose with chiral nematic order and optically variable properties. J. Pulp Pap. Sci. 24, 146-149 (1998).

Dujardin, E., Blaseby, M. & Mann, S. Synthesis of mesoporous silica by sol-gel mineralisation of cellulose nanorod nematic suspensions. J. Mater. Chem. 13, 696-699 (2003).

Thomas, A. & Antonietti, M. Silica nanocasting of simple cellulose derivatives: Towards chiral pore systems with long-range order and chiral optical coatings. Adv. Funct. Mater. 13, 763-766 (2003).

* cited by examiner

FIG. 14 ksanccTEM-10-08-09-b6.tif
TEM-10-08-09-b
Cal: 0.001 micron/pix
12:55 10/08/09
TEM Mode: Imaging 100 nm
HV=60.0kV
Direct Mag: 200000x
UBC BioImaging Facility

INORGANIC MESOPOROUS MATERIALS WITH CHIRAL NEMATIC STRUCTURES AND PREPARATION METHOD THEREOF

CROSS-REFERENCE TO RELATED APPLICATION

This application claims the benefit of U.S. Provisional Application Ser. No. 61/322,508, filed April 9, 2010 under 35 U.S.C. 119(e).

BACKGROUND OF THE INVENTION i) Field of the Invention

The present invention relates to a new mesoporous material, preferably an inorganic mesoporous material such as silica, having both a mesoporous structure and chirality that arises from the chiral nematic ordering of a template, especially a cellulose template.

ii) Description of the Prior Art

Template-synthesis of inorganic solids through the self-assembly of lyotropic liquid crystals allows access to materials with well-defined porous structures.[1-10] First described in 1992 by Beck et al.,[2,9,10] liquid crystal templating has become an important approach to make organized, periodic materials with organization in the 2-50 nm range. Typically mesoporous solids are formed from hydrolysis and condensation of a silica precursor (e.g., tetraethoxysilane) in the presence of a liquid crystalline template. Although ionic surfactants were used in the original invention, diverse molecular (e.g., non-ionic surfactants) and polymeric substances have since been used as templates. The materials obtained have periodic pores in the range of 2-50 nm (i.e., mesoporous) in diameter and organized into hexagonal, cubic, or other periodic structures. An example of a commercial product utilizing mesoporous silica is Chromalith™ made by Merck and sold by scientific supply companies.

Chirality is a property whereby a molecule or object is not superimposable with its mirror image. For example, hands are chiral since the left hand is the mirror image of the right hand, but they are not superimposable. Chirality at the molecular level allows for the assembly of large chiral structures with unique properties that are of fundamental importance in biology and pharmaceuticals. DNA double-stranded helices, for example, are chiral structures. Incorporating chirality into porous inorganic solids is an important endeavour for developing new types of materials that could be useful for separating chiral substances, stereospecific catalysis, chiral recognition (sensing), and photonic materials.[11-14] Only recently has chirality been introduced into hexagonal mesostructures through the use of a chiral surfactant.[15-17] Efforts to impart chirality at a larger length scale or with a chiral nematic ordering may open up new materials with opportunities for application.

The chiral nematic (or cholesteric) liquid crystalline phase, where mesogens organize into a helical assembly, was first observed for cholesteryl derivatives but is now known to exist for a variety of molecules and polymers. The helical organization of a chiral nematic liquid crystal (LC) results in iridescence when the helical pitch is on the order of the wavelength of visible light due to the angle-dependent selective reflection of circularly polarized light. For this reason, chiral nematic LCs have been extensively studied for their photonic properties and used for applications such as in polarizing mirrors, reflective displays, and lasers.[18-20] Chiral nematics have also been exploited for other applications such as the synthesis of helical polymers.[21] In nature, the solid-state chiral nematic organization of chitin results in the brilliant iridescent colours of beetle exoskeletons.[22]

Stable nanocrystals of cellulose may be obtained by sulfuric-acid hydrolysis of bulk cellulose.[23] In water, suspensions of nanocrystalline cellulose (NCC) organize into a chiral nematic phase that can be preserved upon drying, resulting in iridescent films.[24,25] Researchers have attempted to use the chiral nematic phase of NCC to template inorganic materials. Mann showed that NCC can be used to template birefringent silica, but the authors concluded that the birefringence may originate from stress-induced defects rather than from long-range order (though transmission electron microscopy (TEM) images suggested a possible nematic ordering).[26] No long-range helical ordering was observed and no porosity was measured due to the small sample size. Using the chiral nematic phase of hydroxypropylcellulose as a template, Antonietti obtained high-surface area porous silica.[27] Although chiral nematic organization was present in the composite materials, there was no clear proof of long-range chiral ordering in the pure silica replicas.

SUMMARY OF THE INVENTION

It is an object of this invention to provide porous solid-state chiral nematic structures.

It is another object of this invention to provide intermediate structures which have a removable template defining chirality, whereby porosity is introduced by removing the template to leave a chiral structure.

It is still another object of this invention to provide a process for producing a porous solid-state chiral nematic structure.

It is yet another object of this invention to provide a process for producing an intermediate structure which has a removable template defining chirality, whereby a porous solid-state chiral nematic structure can be readily formed from such intermediate structure.

In one aspect of the invention, there is provided a mesoporous siliceous material having chirality.

In another aspect of the invention, there is provided a process of preparing a mesoporous siliceous material having chirality, comprising:

reacting a siliceous precursor in an aqueous suspension of nanocrystalline cellulose (NCC) to form an aqueous mixture of siliceous material and NCC, casting said mixture, removing water from the cast mixture to produce a composite of NCC in a siliceous material matrix, said composite having chirality, and removing said NCC from said composite while maintaining the integrity of the siliceous material matrix.

In still another aspect of the invention, there is provided chiral silicious composite comprising a matrix of siliceous material having NCC embedded therein in a chiral nematic order.

In yet another aspect of the invention, there is provided process of preparing a chiral silicious composite, comprising:

reacting a siliceous precursor in an aqueous suspension of nanocrystalline cellulose (NCC) to form an aqueous mixture of siliceous material and NCC, casting said mixture, and removing water from the cast mixture to produce a composite of NCC in a siliceous material matrix, said composite having chirality.

In other aspects of the invention, the siliceous material is replaced by other inorganic material especially inorganic tin or germanium compounds, especially oxides of tin or germanium. In such cases precursors of the compounds or oxides would be hydrolysed and condensed.

DETAILED DESCRIPTION OF THE INVENTION

In this invention, one or more inorganic monomers or metal-organic monomers are polymerized in the presence of nanocrystalline cellulose to create materials with cellulose nanocrystallites organized in the inorganic matrix, and after removing the cellulose, porous materials are obtained. A significant advantage of the invention is that the porous materials retain the chiral nematic order which is characteristic of the nanocrystalline cellulose, in the pore structure which remains after removal of the cellulose.

The siliceous material may be, for example, a hydrolysable silicon precursor, a polymerizable organo-silicon monomer or inorganic and metal-organic structures (e.g., based on organosilanes). The silica precursor is first hydrolyzed then undergoes condensation. The process is complicated, but involves forming Si(OH) groups by hydrolysis, then two of these combine and eliminate water:

in the condensation step.

The invention provides a new method to make porous solid-state materials that have chiral nematic structures. When a suitable precursor to silica (e.g., tetraethoxysilane or tetramethoxysilane) is hydrolyzed in the presence of nanocrystalline cellulose (NCC), a film is obtained after drying that is a composite structure of cellulose nanocrystals embedded in a silica matrix. Upon calcination to remove the NCC template (typically at 540° C. under air), a porous silica material is obtained as a powder or as a film, depending on the morphology of the starting composite. Nitrogen adsorption measurements indicate that the materials are porous and have large surface areas. These new porous materials are chiral—they preferentially reflect light of one circular polarization. Porous solid-state materials with chiral pores and high surface areas are attractive for many practical applications, including chromatography supports (for separation of chiral or achiral components), for templating other nanomaterials, for adsorbents of heavy metals, for adsorbents of chemicals and gases, lightweight reinforcement materials, low k dielectric materials, membranes, and as supports for catalysts.

Figure 1:
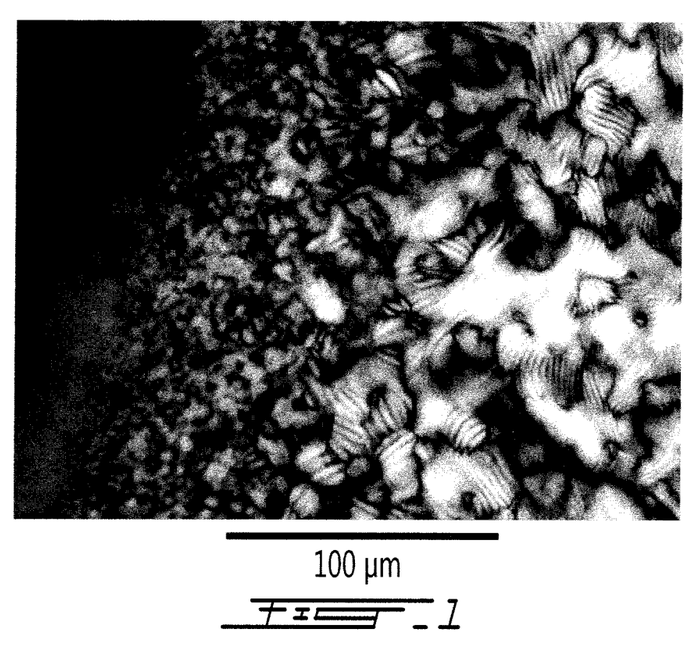
FIG. 1: is a POM image of NCC and hydrolyzed TEOS showing the establishment of chiral nematic texture during evaporation.
Figure 2:
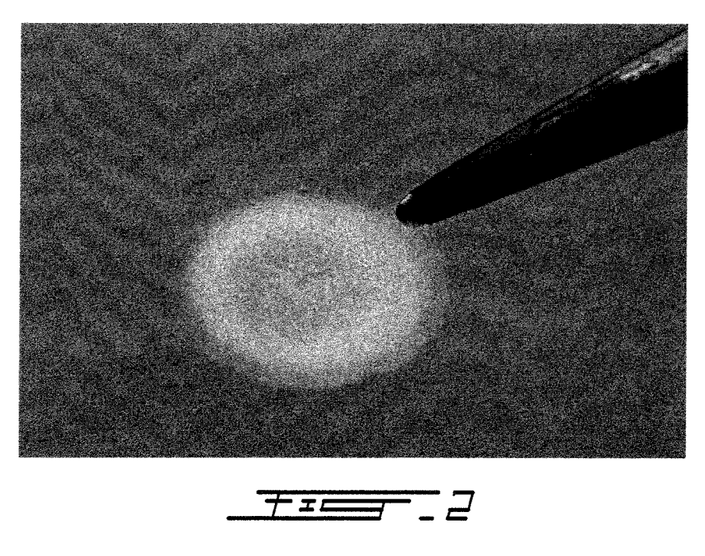
FIG. 2: is a photograph of free-standing iridescent NCC-silica composite film.

Nanocrystalline cellulose (NCC) prepared by sulfuric-acid hydrolysis of softwood kraft pulp fibres, other woody or nonwoody biomass, is used, in this invention, as a chiral nematic template for production of mesoporous silica. NCC suspensions ranging from about 1-10 wt. % (preferably 1-6 wt %) can suitably be employed, and at about pH 2.4, tetraethylorthosilicate (TEOS), tetramethylorthosilicate (TMOS), or bis(triethoxysilyl)methane are hydrolyzed in the presence of NCC in the suspension, to give a homogeneous mixture. Polarizing optical microscopy (POM) showed the formation of a fingerprint texture during evaporation, indicating that the chiral nematic phase is established during drying even in the presence of the silica precursor (FIG. 1). Samples were deposited onto a polypropylene surface and left under ambient conditions at room temperature to dry (typically 1-2 days) until a free-standing film was obtained (FIG. 2). The hydrolysis is suitably performed at a pH in a range above 2 up to 7, preferably 2.4 to 4.

Figure 3:
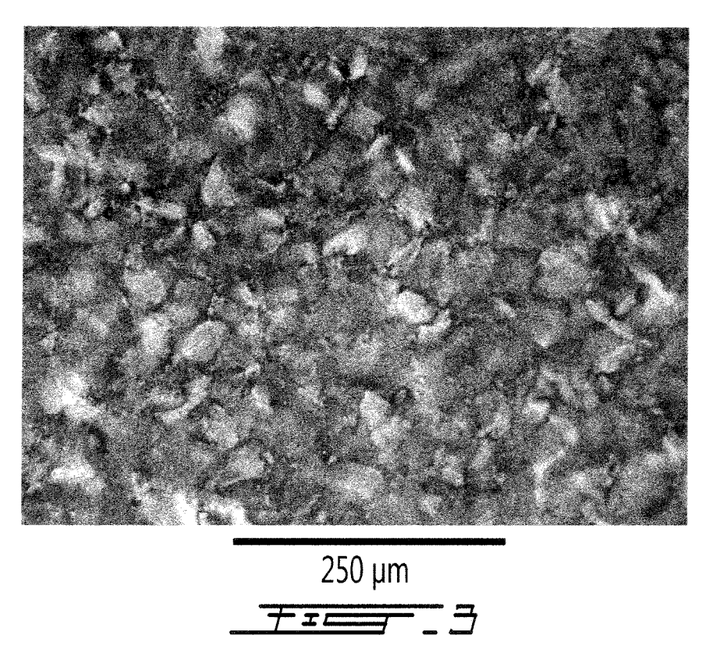
FIG. 3: is a POM image of NCC-silica composite film.
Figure 4:
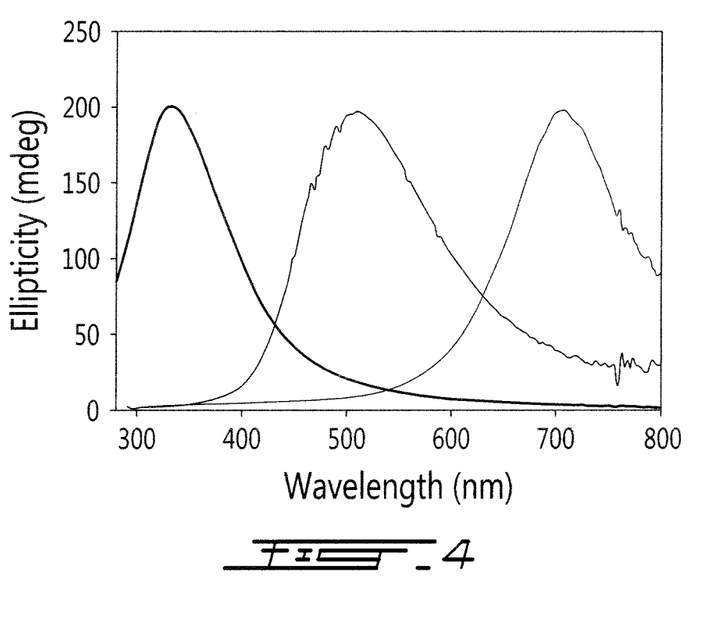
FIG. 4: is a CD spectra of 3 different coloured NCC-silica composite films.

It appears to be important to use a pH above 2, preferably at least 2.4; at about pH 2 and below, no chiral nematic order was observed in the films as prepared and at pH>7, films did not show the typical iridescence or chiral nematic texture by POM. Materials prepared with pH 3.5 also exhibited iridescence. It seems that a range of pH ~2 to 7 is the maximum range for preparing the materials, preferably about 2.4-4. Visually, as well as by POM (FIG. 3) and SEM, the free-standing composite films look similar to those composed of pure NCC; in contrast to pure NCC films, however, the composite films cannot be resuspended in water due to the condensed silica matrix. Circular dichroism (CD) confirms the chiral origin of the iridescence in the films (FIG. 4). The composite films give a strong positive ellipticity in the CD signal that indicates they have a left-handed helical structure on the order of several hundred nanometers.

The peak wavelength reflected by chiral nematic structures may be tuned by altering the helical pitch. The colours of the composite films can be varied from blue to the near infrared by increasing the proportion of TEOS to NCC.

These composite materials are made of silica by the hydrolysis and condensation of TEOS or TMOS in the presence of NCC. By using other polymerizable precursors, other inorganic structures with NCC embedded in a chiral nematic ordering may be created. As one example bis(triethoxysilyl)methane works as a polymerizable monomer, giving an organosilicon matrix with a chiral nematic NCC incorporated.

Figure 5:
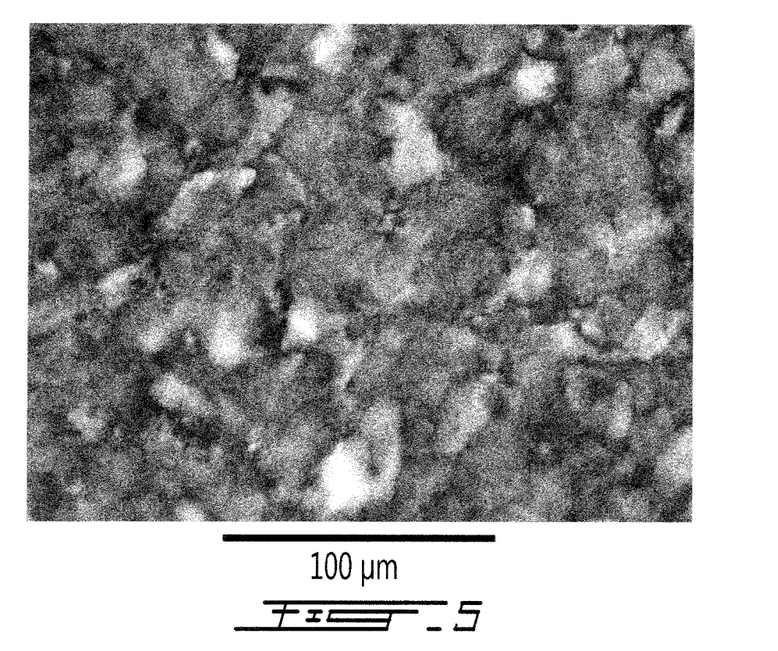
FIG. 5: is a POM image of calcined silica film.
Figure 6:
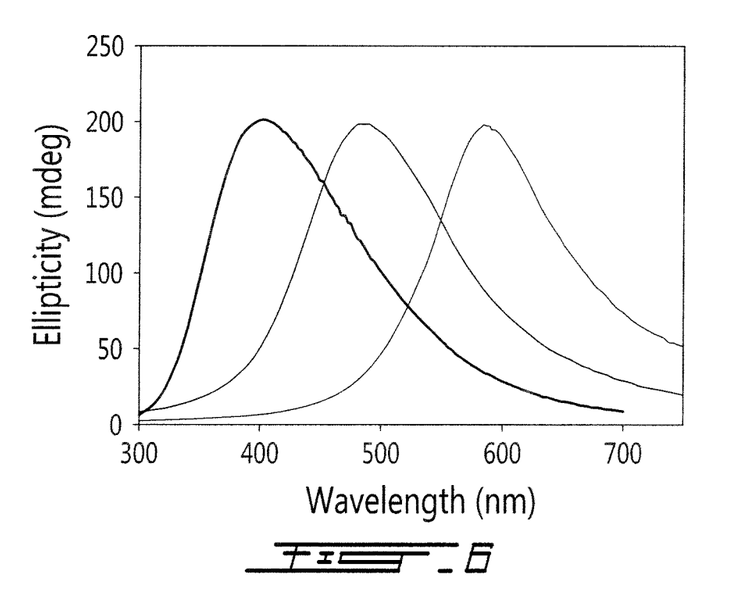
FIG. 6: is a CD spectra of 3 different coloured pure silica films.

Calcination of the films is performed at 540° C. for 6 h under air. Calcination of the composite films results in iridescent or colourless mesoporous silica films depending on the composition of the starting composite film. The calcined films all show strong birefringence by POM and a texture (FIG. 5) that is very similar to that observed for pure NCC films. The peak reflectance in the CD spectrum of the calcined films is blue-shifted relative to the starting NCC-silica composites. For example, the chiral reflection of a red composite film was shifted by 225 nm after calcination to give a green silica film. Likewise, blue composite films give optically transparent silica films. CD experiments confirm that the mesoporous silica films reflect circularly polarized light (FIG. 6) and therefore preserve the left-handed helical ordering of NCC. Films reflecting circularly polarized light from UV to red wavelengths can thus be obtained by calcination of a variety of composite films that reflected light from blue to near-infrared wavelengths.

Figure 7:
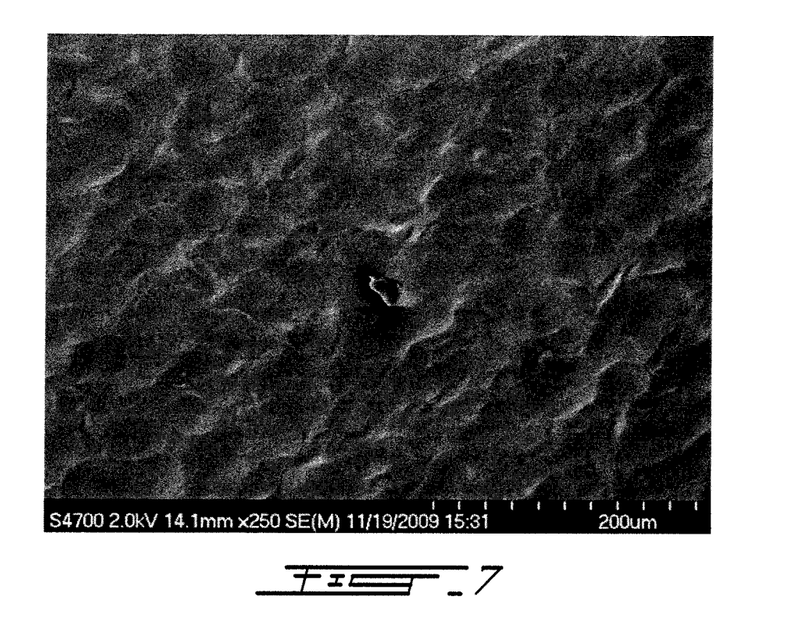
FIG. 7: is an SEM image showing top view of silica film.
Figure 8:
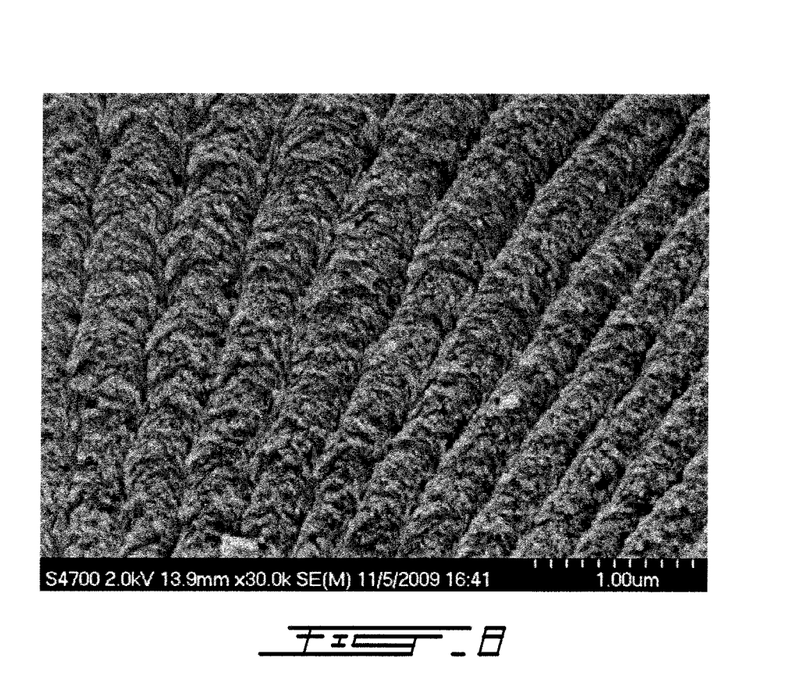
FIG. 8: is an SEM image showing chiral nematic organization in a cross-section of silica film.
Figure 10:
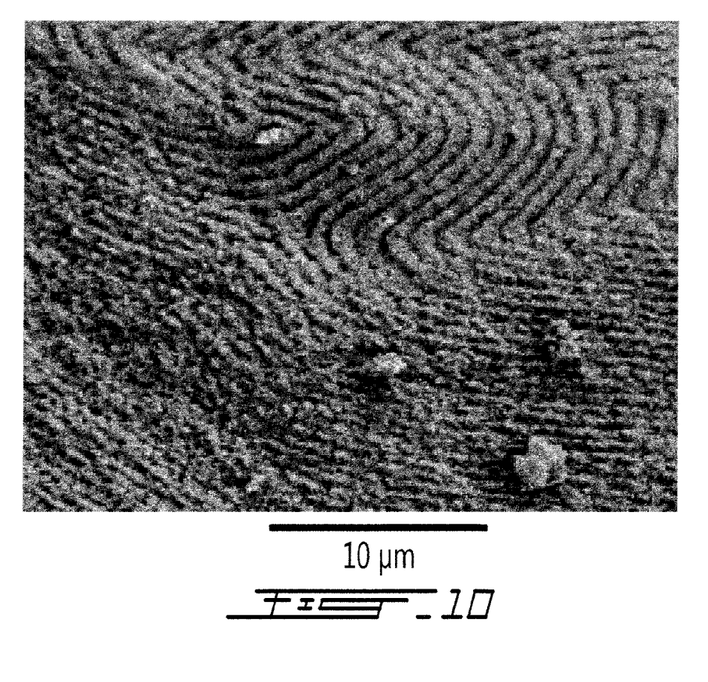
FIG. 10: is an SEM image showing fingerprint texture in silica film.
Figure 11:
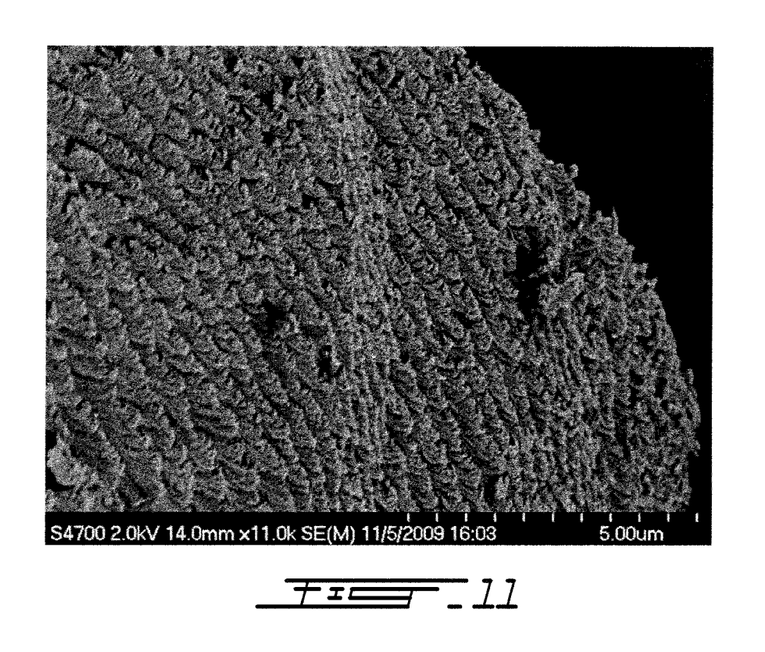
FIG. 11: is an SEM image of NCC-silica composite film.
Figure 12:
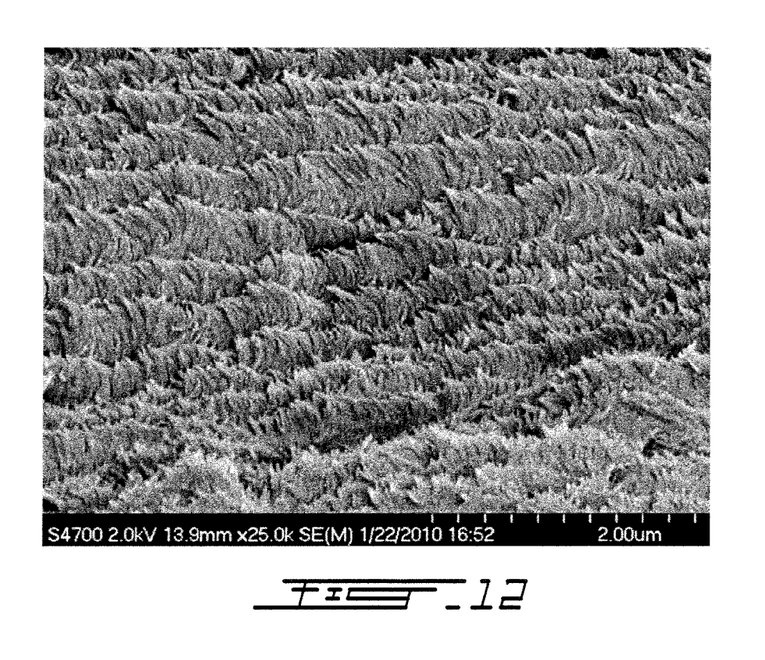
FIG. 12: is an SEM image of pure NCC film.

Scanning electron microscopy (SEM) provides further confirmation of the replication of chiral nematic organization in the mesoporous silica films. The chiral nematic structure of NCC is imprinted into the silica at various levels. Domain structures are evident in the relatively smooth surface of the film (FIG. 7). Perpendicular to the surface of the film, a layered structure is observed with a repeating distance of several hundred nanometers that arises from the helical pitch of the chiral nematic phase and is consistent with the reflection of visible light (FIG. 8). At higher magnification a twisting rod-like morphology (FIG. 9) can be resolved. Throughout the entire sample, this twisting appears to occur in a counter-clockwise direction when moving away from the viewer, which corresponds to a left-handed helical organization. In some locations fingerprint defects can be seen that correspond to condensed versions of those observed by POM in the LC phase (FIG. 10). Overall, the structure of the materials is consistent with the CD and POM characterization and looks extremely similar to SEM images obtained for the composite films (FIG. 11) and pure NCC films (FIG. 12). This is direct evidence that the chiral nematic organization of NCC has been replicated in the silica films.

Figure 13:
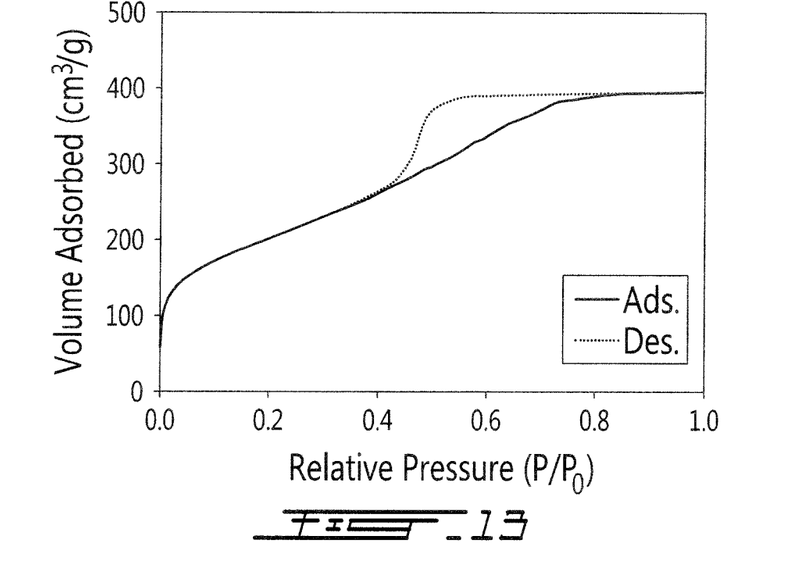
FIG. 13: is an $N_2$ adsorption isotherm of mesoporous silica from preparation 1.
Figure 14:
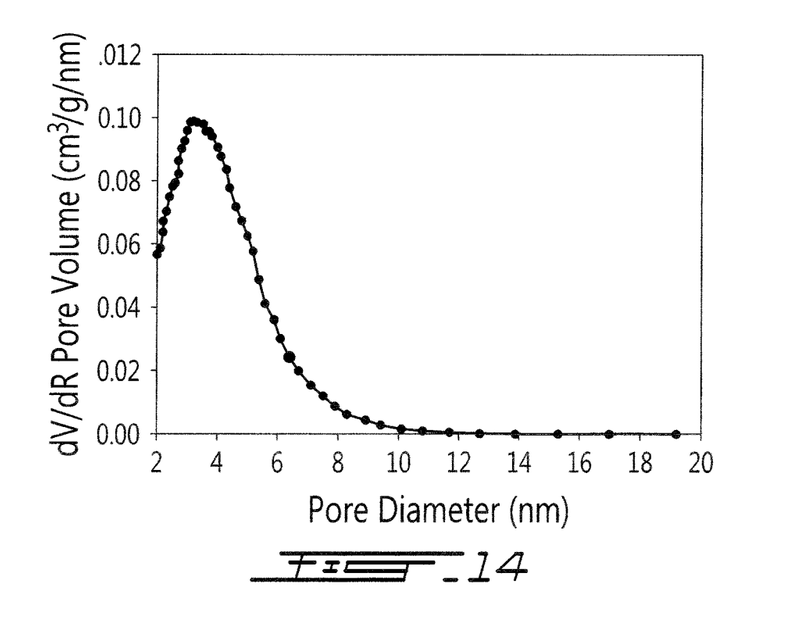
FIG. 14: is a typical BJH pore size distribution of mesoporous silica prepared from NCC.
Figure 15:
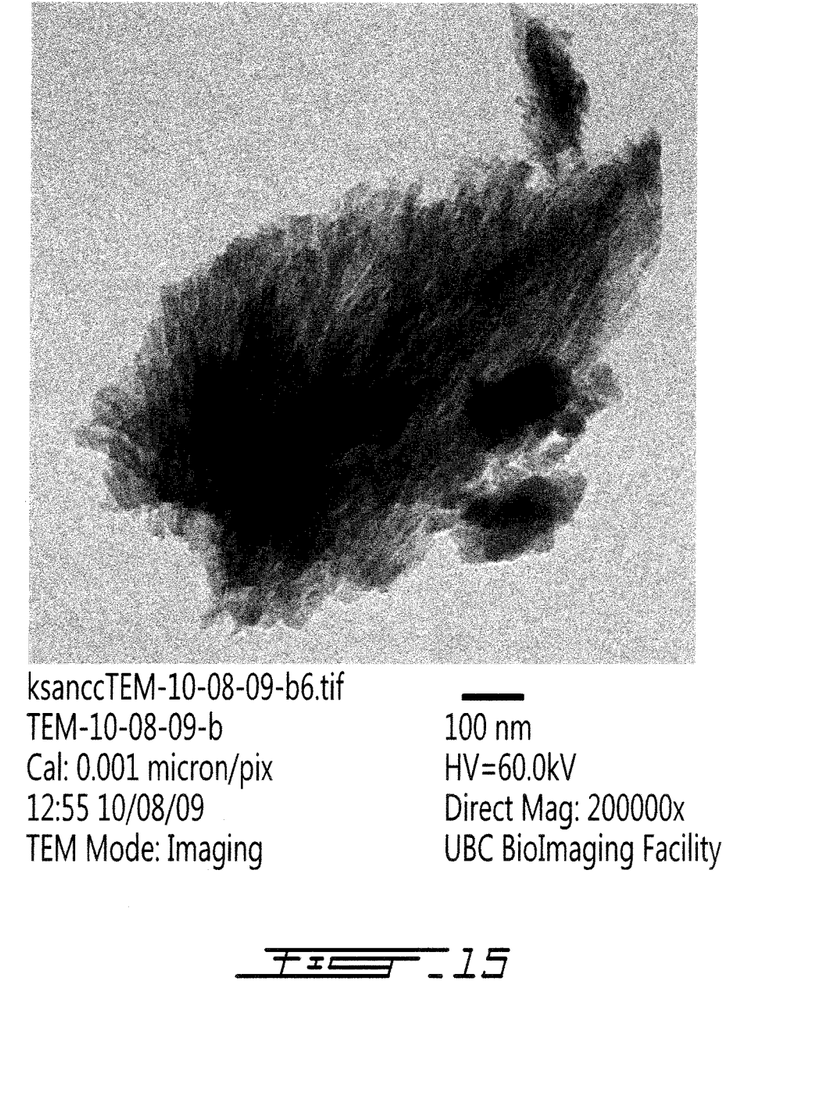
FIG. 15: is a TEM image of mesoporous silica.

The chiral silica films are mesoporous as determined by nitrogen adsorption studies. Type IV adsorption isotherms with large hysteresis loops are observed in all of the calcined samples, with BET (Brunauer-Emmett-Teller model) surface areas ranging from ~750-300 m$^2$/g, depending on the NCC/silica ratio (FIG. 13). The BJH (Barret-Joyner-Halenda model) pore size distributions give an average pore diameter of ca. 4 nm, thus showing that individual nanocrystals, as opposed to bundles, are successfully replicated in the pore structure (FIG. 14). TEM imaging shows long, aligned pores with diameters consistent with those measured by gas adsorption (FIG. 15). The measured pore volumes are less than the predicted values indicating that some pore contraction occurred during calcination. The discrepancy is greater for samples with a lower silica/NCC ratio, which is also reflected by a smaller average pore size for these samples.

Figure 16:
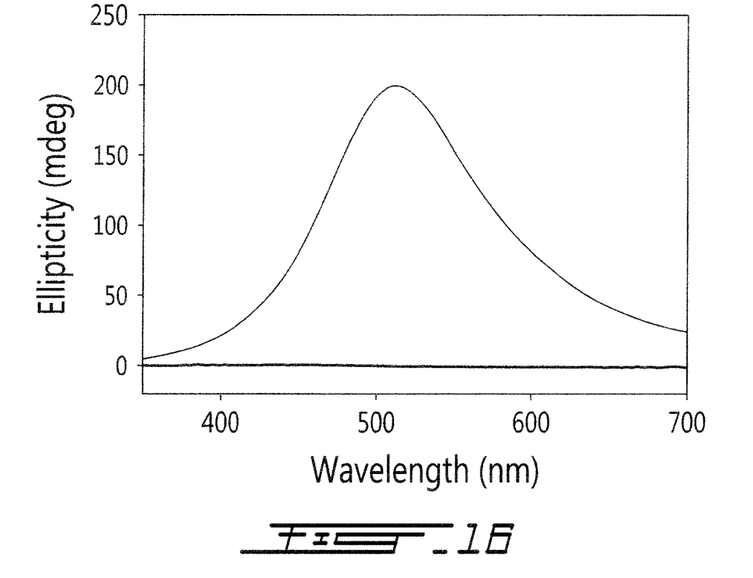
FIG. 16: is a CD spectra before (top curve) and after (bottom curve) soaking a mesoporous silica film with water.

To demonstrate the unique properties of the chiral nematic mesoporous films their adsorption of liquids was examined. These films rapidly adsorb water (and many other common solvents) and become transparent and colourless, which can be detected visually. The birefringence of the films is also drastically reduced when the solvent is adsorbed (in this case, the refractive index difference between the pores and the walls is reduced when the channels are filled with water instead of air, changing the extent of birefringence). These changes are completely reversible and the films regain their iridescence and birefringence upon drying. By circular dichroism it can be seen that the CD signal is substantially decreased after soaking (FIG. 16). As a control, no change was apparent when water (or other solvents) was added to an NCC/silica composite film before calcination. This is a unique property of the mesoporous silica that enables a moisture sensor based on the change in CD signal.

The above described colour change is a unique feature of the mesoporous materials of the invention. Other mesoporous materials readily absorb water, but normally this cannot be seen because the material is colourless before and after liquid addition. The fact that these materials have photonic properties (in this case selective reflection of polarized light in the visible spectrum) owing to the chiral nematic organization leads to colour in these materials.

A particularly unique aspect of the materials of the invention is the combination of mesoporosity, which is associated with high surface area, pore sizes of ~1-50 nm. with chiral nematic ordering resulting in chiral structure, selective reflection of polarized light, and iridescence.

It is within the scope of the invention to make these materials using various organosilica reagents or combinations of organosilanes (e.g. $Si(OEt)_4+RSi(OEt)_3$, where R is an alkyl, branched alkyl, phenyl, or other organic component). Possible components of the materials are any molecules of the type $R_3Si(OR')$, $R_2Si(OR')_2$, $RSi(OR')_3$, and $Si(OR)_4$. Silicon tetraisopropoxide, tetrapropyloxysilane, and tetrabutyloxysilane are particular examples. Other substitution patterns are possible, but may require some additional $Si(OR)_4$ to support the network.

Furthermore, bridged compounds of the type $(R'O)_3Si$—R—$Si(OR')_3$ are possible precursors. Examples include where R=$CH_2$ (bis(triethoxysilyl)methane) already mentioned, R=$C_6H_4$ (phenyl) and R=$CH_nH_{2n}$ (e.g., ethylene, propylene, etc.) and R' is an organic group, preferably a linear or branched alkyl or another organic such as an unsaturated hydrocarbon or a benzyl group.

As well as silica, analogous $GeO_2$ (germania) and $SnO_2$ (tin dioxide) materials may be made by using analogous precursors.

The materials prepared in accordance with the invention have an organization that shows a positive ellipticity by CD (left-handed organization). The other organization (right-handed) is not known, but if it could be discovered, then this method should be applied to make the enantiomeric structure.

The mesoporous materials of the invention may be obtained as free-standing or self-supporting films, or as film coatings on substrates defining an article.

EXAMPLES

In the examples, sonication was applied to ensure that the NCC particles were dispersed. The sonicator was a standard laboratory model (2 A, 120 V) available from VWR (Aquasonic model 50T). A sonication time of 10-15 minutes was typically applied prior to addition of the silicon-containing compound.

Preparation 1

Figure 17:
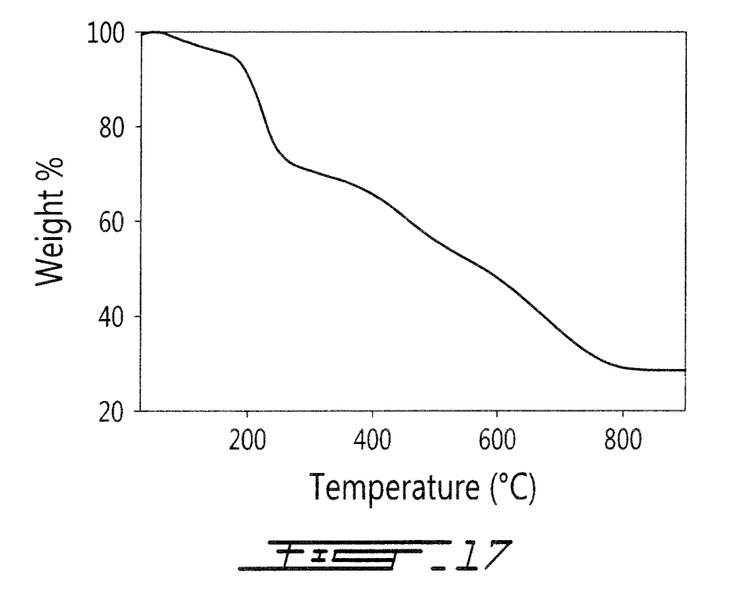
FIG. 17: is a TGA of NCC-silica composite from preparation 1.
Figure 18:
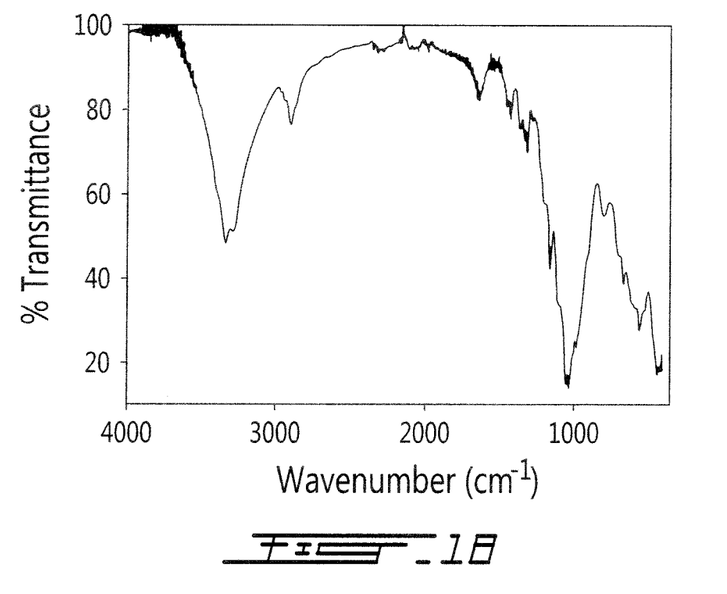
FIG. 18: is an IR spectrum of NCC-silica composite from preparation 1.

Synthesis of Silica/NCC Composite:
0.600 mL of tetraethoxy silane (TEOS) is added to 10 mL of a freshly sonicated 3% aqueous NCC suspension. The mixture is stirred at 60° C. until a homogeneous mixture is obtained (~3 h), indicating complete hydrolysis of the TEOS. This is allowed to cool to room temperature and drop-cast on a polypropylene Petri dish. After slow evaporation at room temperature blue iridescent free-standing films are obtained (490 mg). Graphs of the TGA and IR data are shown in FIG. 17 and FIG. 18 respectively.

Figure 19:
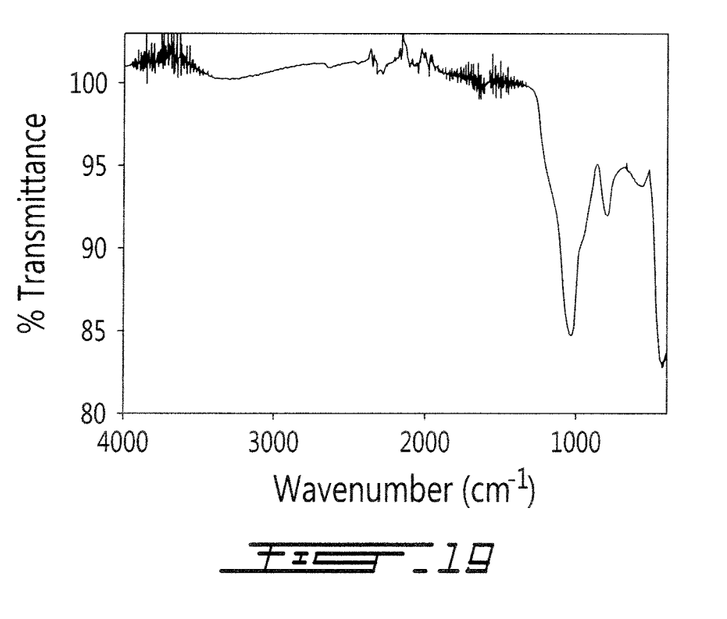
FIG. 19: is an IR spectrum of calcined sample from preparation 1.

Calcination:

300 mg of the composite film are heated at a rate of 120° C./h to 540° C. and kept at 540° C. under flowing air for 6 h. After slowly cooling to room temperature, 100 mg of free-standing colourless films can be recovered. The IR spectrum of the sample confirms the complete removal of NCC (FIG. 19). Nitrogen adsorption measurements show a BET surface area of 720 $m^2/g$ (FIG. 13), while SEM images reveal a structure consistent with chiral nematic organization. TEM imaging shows long channels with dimensions consistent with those measured by gas adsorption (FIG. 14).

Preparation 2

Synthesis of Silica/NCC Composite:

1.950 mL of TEOS is added to 10 mL of a freshly sonicated 3% aqueous NCC suspension, and the mixture is stirred at 60° C. until a homogeneous mixture is obtained (~3 h), indicating complete hydrolysis of the TEOS. This is allowed to cool to room temperature and drop-cast on a polypropylene Petri dish. After slow evaporation at room temperature, free-standing red iridescent films are obtained.

Calcination:

300 mg of the composite film are heated at a rate of 120° C./h to 540° C. and kept at 540° C. under flowing air for 6 h. After slowly cooling to room temperature 180 mg of free-standing blue-green films are recovered. IR confirms the complete removal of NCC, and nitrogen adsorption measurements show a BET surface area of 408 $m^2/g$.

Preparation 3

Synthesis of Silica/NCC Composite:

0.750 mL of TEOS is added to 6 mL of a freshly sonicated 2% aqueous NCC suspension. The mixture is stirred at 60° C. until a homogeneous mixture is obtained (~3 h), indicating complete hydrolysis of the TEOS. This is allowed to cool to room temperature and drop-cast on a polypropylene Petri dish. After slow evaporation at room temperature colourless films are obtained.

Calcination:

300 mg of the composite film are heated at a rate of 120° C./h to 540° C. and kept at 540° C. under flowing air for 6 h. After slowly cooling to room temperature 195 mg of free-standing red films are recovered. The IR spectrum of the sample confirms the complete removal of NCC.

Figure 9:
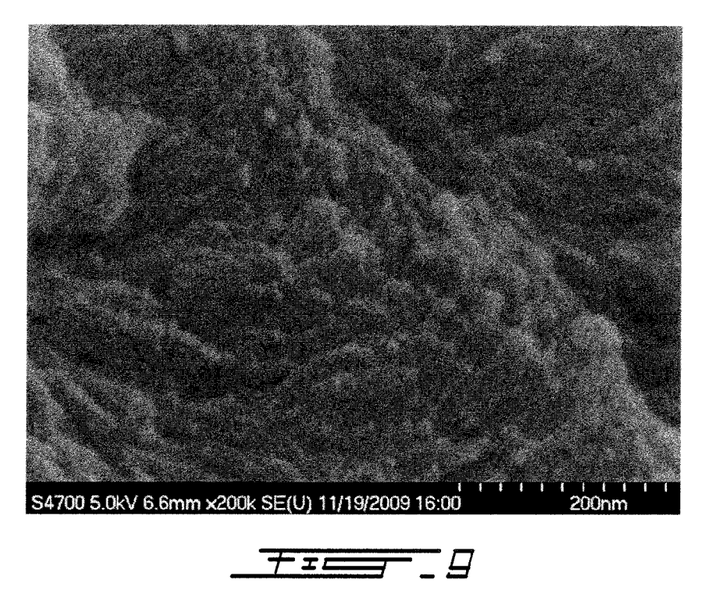
FIG. 9: is an SEM image at high magnification showing twisting rod-like morphology.

Nitrogen adsorption measurements show a BET surface area of 240 $m^2/g$, and SEM images reveal a structure consistent with chiral nematic organization (FIG. 9).

Preparation 4

Synthesis of Silica/NCC Composite:

0.400 mL of tetramethoxysilane (TMOS) is added dropwise to 5 mL of a freshly sonicated 6% aqueous NCC suspension. Vigorous bubbling indicates the rapid hydrolysis of TMOS. The mixture is stirred for an additional 30 minutes at room temperature and then drop-cast onto a polypropylene Petri dish. After slow evaporation at room temperature iridescent blue films are obtained.

Calcination:

300 mg of the composite film are heated at a rate of 120° C./h to 540° C. and kept at 540° C. under flowing air for 6 h. After slowly cooling to room temperature 97 mg of free-standing colourless films are recovered. The IR spectrum of the sample confirms the complete removal of NCC. Nitrogen adsorption measurements show a BET surface area of 673 $m^2/g$.

Preparation 5

Figure 20:
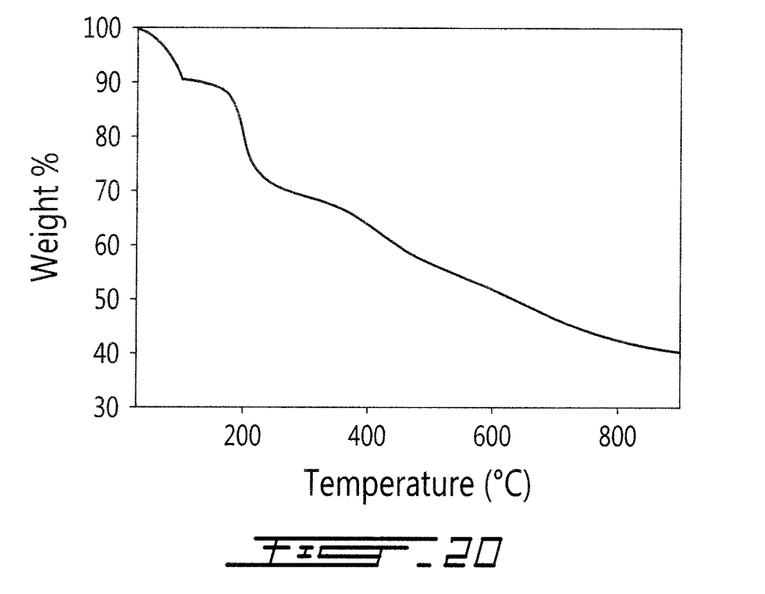
FIG. 20: is a TGA of organosilica-NCC composite from preparation 5.

Synthesis of Organosilica/NCC Composite:

0.600 mL of bis(triethoxysilyl)methane is added to 5 mL of a freshly sonicated 6% aqueous NCC suspension. The mixture is stirred at 60° C. until a homogeneous mixture was obtained (~6 h), indicating complete hydrolysis of the organosilica precursor. This is allowed to cool to room temperature and drop-cast on a polypropylene Petri dish. After slow evaporation at room temperature blue films can be obtained. A graph of the TGA is provided for comparison (FIG. 20).

Figure 21:
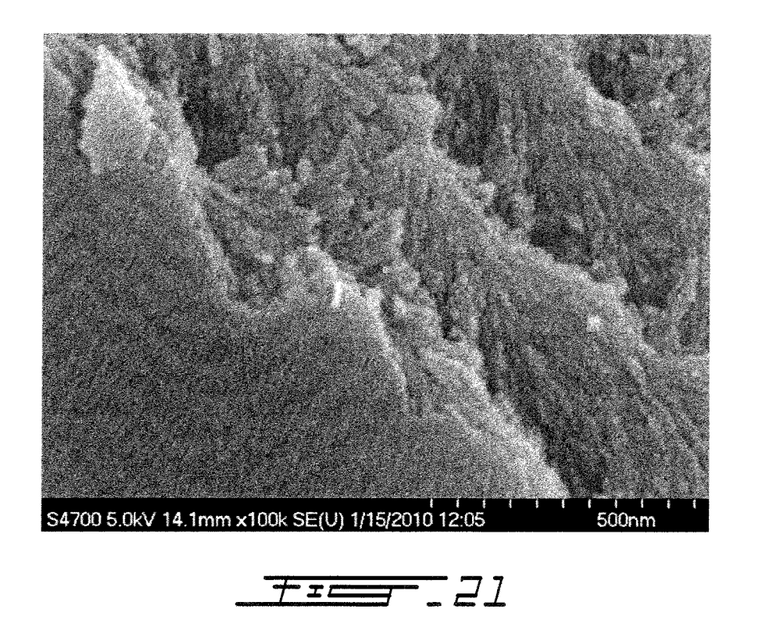
FIG. 21: is an SEM image of calcined sample from preparation 5.

Calcination:

300 mg of the composite film are heated at a rate of 120° C./h to 540° C. and kept at 540° C. under flowing air for 6 h. After slowly cooling to room temperature 195 mg of free-standing colourless films are recovered. The IR spectrum of the sample confirms the complete removal of NCC. SEM imaging confirms the chiral nematic organization in the calcined sample (FIG. 21). Nitrogen adsorption measurements show a BET surface area of 414 $m^2/g$.

References

1. Kanatzidis, M. G. Beyond silica: nonoxidic mesostructured materials. *Adv. Mater.* 19, 1165-1181 (2007).
2. Kresge, C. T., Leonowicz, M. E., Roth, W. J., Vartuli, J. C. & Beck, J. S. Ordered mesoporous molecular sieves synthesized by a liquid-crystal template mechanism. *Nature* 359, 710-712 (1992).
3. Yang, P., Zhao, D., Margolese, D. I., Chmelka, B. F. & Stucky, G. D. Generalized syntheses of large-pore mesoporous metal oxides with nanocrystalline walls. *Nature* 396, 152-154 (1998).
4. Armatas, G. A. & Kanatzidis, M. G. Hexagonal mesoporous germanium. *Science* 313, 817-820 (2006).
5. MacLachlan, M. J., Coombs, N. & Ozin, G. A. Non-aqueous supramolecular assembly of metal germanium sulfide mesostructures from $[Ge_4S_{10}]^{4-}$ clusters. *Nature* 397, 681-684 (1999).
6. Inagaki, S., Guan, S., Ohsuna, T., Terasaki, O. An ordered mesoporous organosilica hybrid material with a crystal-like wall structure. *Nature* 416, 304-307 (2002).
7. Sun, D., Riley, A. E., Cadby, A. J., Richman, E. K., Korlann, S. D. & Tolbert, S. H. Hexagonal nanoporous germanium through surfactant-driven self-assembly of Zintl clusters. *Nature* 441, 1126-1130 (2006).
8. Attard, G. S., Glyde, J. C. & Goltner, C. G. Liquid-crystalline phases as templates for the synthesis of mesoporous silica. *Nature* 378, 366-368 (1995).
9. Beck, J. S. et al. U.S. Pat. No. 5,108,725 (1992).
10. Beck, J. S. et al. WO Patent 91/11390 (1991).
11. Gabashvili, A., Medina, D. D., Gedanken, A. & Mastai, Y. Templating mesoporous silica with chiral block copolymers and its application for enantioselective separation. *J. Phys. Chem. B* 111, 11105-11110 (2007).
12. Johnson, B. F. G. et al. Superior performance of a chiral catalyst confined within mesoporous silica. *Chem. Commun.* 1167-1168 (1999).
13. Fireman-Shoresh, S., Popov, I., Avnir, D. & Marx, S. Enantioselective, chirally templated sol-gel thin films. *J. Am. Chem. Soc.* 127, 2650-2655 (2005).
14. Hodgkinson, I. & Wu, Q. H. Inorganic chiral optical materials. *Adv. Mater.* 13, 889-897 (2001).
15. Che, S. et al. Synthesis and characterization of chiral mesoporous silica. *Nature* 429, 281-284 (2004).

16. Qiu, H. B., Inoue, Y. & Che, S. N. Supramolecular chiral transcription and recognition by mesoporous silica prepared by chiral imprinting of a helical micelle. *Angew. Chem. Int. Ed.* 48, 3069-3072 (2009).
17. Tatsumi, T., Che, S. & Sakamoto, K. USPTO Patent Application 20090043003 (2009).
18. Broer, D. J., Lub, J. & Mol, G. N. Wide-band reflective polarizers from cholesteric polymer networks with a pitch gradient. *Nature* 378, 467-469 (1995).
19. Yang, D.-K., West, J. L., Chien, L.-C. & Doane, J. W. Control of reflectivity and bistability in displays using cholesteric liquid crystals. *J. Appl. Phys.* 76, 1331-1333 (1994).
20. Kopp, V. I., Fan, B., Vithana, H. K. M. & Genack, A. Z. Low-threshold lasing at the edge of a photonic stop band in cholesteric liquid crystals. *Opt. Lett.* 23, 1707-1709 (1998).
21. Akagi, K. et al. Helical polyacetylene synthesized with a chiral nematic reaction field. *Science* 282, 1683-1686 (1998).
22. Sharma, V., Cme, M., Park, J. O. & Srinivasarao, M. Structural origin of circularly polarized iridescence in jeweled beetles. *Science* 325, 449-451 (2009).
23. Mukherjee, S. M. & Woods, H. J. X-ray and electron microscope studies of the degradation of cellulose by sulphuric acid. *Biochim. Biophys. Acta* 10, 499-511 (1953).
24. Revol, J. F., Bradford, H., Giasson, J., Marchessault, R. H. & Gray, D. G. Helicoidal self-ordering of cellulose microfibrils in aqueous suspension. *Int. J. Biol. Macromol.* 14, 170-172 (1992).
25. Revol, J. F., Godbout, L. & Gray, D. G. Solid self-assembled films of cellulose with chiral nematic order and optically variable properties. *J. Pulp Pap. Sci.* 24, 146-149 (1998).
26. Dujardin, E., Blaseby, M. & Mann, S. Synthesis of mesoporous silica by sol-gel mineralisation of cellulose nanorod nematic suspensions. *J. Mater. Chem.* 13, 696-699 (2003).
27. Thomas, A. & Antonietti, M. Silica nanocasting of simple cellulose derivatives: Towards chiral pore systems with long-range order and chiral optical coatings. *Adv. Funct. Mater.* 13, 763-766 (2003).

The invention claimed is:
1. A process of preparing a mesoporous siliceous material having chirality in a chiral nematic order, comprising:
   a) reacting a siliceous precursor in an aqueous suspension of nanocrystalline cellulose (NCC) to form an aqueous mixture of siliceous material and NCC,
   b) casting said mixture,
   c) removing water from the cast mixture to produce a composite of NCC in a siliceous material matrix, said composite having chirality in a chiral nematic order, and
   d) removing said NCC from said composite while maintaining the integrity of the siliceous material matrix.
2. A process according to claim 1, wherein said siliceous precursor is a hydolysable silicon precursor and said reacting in a) comprises hydrolysing the hydolysable silicon precursor in said suspension to form an aqueous mixture of silica and NCC, said matrix in c) and d) being a silica matrix.
3. A process according to claim 2, wherein said hydolysing is at a pH in a range above 2 up to 7.
4. A process according to claim 3, wherein said pH is 2.4 to 4.
5. A process according to claim 2, wherein said hydolysable silicon precursor is tetraethylorthosilicate (TEOS) or tetramethylorthosilicate (TMOS).
6. A process according to claim 5, wherein said siliceous precursor is bis(triethoxysilyl)methane, and said reacting in a) comprises polymerizing said bis(triethoxysilyl)methane.
7. A process according to claim 1, wherein said casting of said mixture in b) comprises forming a cast film of the mixture.
8. A process according to claim 1, wherein said removing in c) comprises evaporating water from said cast mixture.
9. A process according to claim 1, wherein said removing in d) comprises calcining said composite.
10. A process according to claim 1, wherein said aqueous suspension has a concentration of nanocrystalline cellulose (NCC) of about 1-10 wt. %.
11. A mesoporous siliceous material having chiral nematic order.
12. A mesoporous siliceous material according to claim 11, wherein said siliceous material is silica.
13. A mesoporous silica according to claim 12, having a surface area ranging from ~750-300 m$^2$/g.
14. A mesoporous silica according to claim 12, characterized in that the silica reversibly adsorbs water to become transparent and colourless.
15. A process of preparing a chiral silicious composite having chiral nematic order, comprising:
   a) reacting a siliceous precursor in an aqueous suspension of nanocrystalline cellulose (NCC) to form an aqueous mixture of siliceous material and NCC,
   b) casting said mixture, and
   c) removing water from the cast mixture to produce a composite of NCC in a siliceous material matrix, said composite having chirality in a chiral nematic order.
16. A process according to claim 15, wherein step a) comprises hydrolysing a hydolysable silicon precursor in an aqueous suspension of nanocrystalline cellulose (NCC) to form an aqueous mixture of silica and NCC, and step c) comprises removing water from the cast mixture to produce a composite of NCC in a silica matrix, said composite having chirality in a chiral nematic order.
17. A process according to claim 16, wherein said hydolysing is at a pH in a range above 2 up to 7.
18. A process according to claim 17, wherein said pH is 2.4 to 4.
19. A process according to claim 16, wherein said hydolysable silicon precursor is tetraethylorthosilicate (TEOS) or tetramethylorthosilicate (TMOS).
20. A process according to claim 15, wherein said siliceous precursor is bis(triethoxysilyl)methane, and said reacting in a) comprises polymerizing said bis(triethoxysilyl)methane.
21. A process according to claim 15, wherein said casting of said mixture in b) comprises forming a cast film of the mixture.
22. A process according to claim 15, wherein said removing in c) comprises evaporating water from said cast mixture.
23. A process according to claim 15, wherein said aqueous suspension has a concentration of nanocrystalline cellulose (NCC) of about 1-10 wt. %.
24. A chiral siliceous composite comprising a matrix of siliceous material having nanocrystalline cellulose (NCC) embedded therein in a chiral nematic order.
25. A chiral siliceous composite according to claim 24, wherein said siliceous material is silica.
26. A process of preparing a mesoporous inorganic material having chirality in a chiral nematic order, comprising:
   a) reacting an inorganic precursor in an aqueous suspension of nanocrystalline cellulose (NCC) to form an aqueous mixture of inorganic material and NCC,
   b) casting said mixture, c) removing water from the cast mixture to produce a composite of NCC in an inorganic material matrix, said composite having chirality in a chiral nematic order, and d) removing said NCC from said composite while maintaining the integrity of the inorganic material matrix.

27. A process according to claim 26, wherein said inorganic material is an oxide of silicon, tin or germanium.

28. A mesoporous inorganic material having chirality in a chiral nematic order, wherein said inorganic material is an oxide of silicon, tin or germanium.

29. A process of preparing a chiral inorganic/organic composite having chirality in a chiral nematic order, comprising:
  a) reacting an inorganic precursor in an aqueous suspension of nanocrystalline cellulose (NCC) to form an aqueous mixture of inorganic material and NCC,
  b) casting said mixture, and
  c) removing water from the cast mixture to produce a composite of NCC in an inorganic material matrix, said composite having chirality in a chiral nematic order.

30. A process according to claim 29, wherein said inorganic material is an oxide of silicon, tin or germanium.

31. A chiral inorganic/organic composite comprising a matrix of inorganic material having nanocrystalline cellulose (NCC) embedded therein in a chiral nematic order.

32. A composite according to claim 31, wherein said inorganic material is an oxide of silicon, tin or germanium.

33. A mesoporous material of claim 11, in the form of a self-supporting or free-standing film.

34. An article comprising a substrate having a coating thereon of a mesoporous material of claim 11.

* * * * *